US012454287B2

(12) United States Patent
Zhou et al.

(10) Patent No.: US 12,454,287 B2
(45) Date of Patent: Oct. 28, 2025

(54) AUTONOMOUS DRIVING CONTROL METHOD AND APPARATUS

(71) Applicant: SHENZHEN YINWANG INTELLIGENT TECHNOLOGIES CO., LTD., Shenzhen (CN)

(72) Inventors: Wei Zhou, Shanghai (CN); Xiaoqing Liu, Shanghai (CN)

(73) Assignee: Shenzhen Yinwang Intelligent Technologies Co., Ltd.

( * ) Notice: Subject to any disclaimer, the term of this patent is extended or adjusted under 35 U.S.C. 154(b) by 334 days.

(21) Appl. No.: 18/161,623

(22) Filed: Jan. 30, 2023

(65) Prior Publication Data

US 2023/0174105 A1    Jun. 8, 2023

Related U.S. Application Data

(63) Continuation of application No. PCT/CN2021/107468, filed on Jul. 20, 2021.

(30) Foreign Application Priority Data

Jul. 31, 2020   (CN) .......................... 202010754688.8

(51) Int. Cl.
*B60W 60/00* (2020.01)
*B60W 40/04* (2006.01)
*B60W 40/06* (2012.01)

(52) U.S. Cl.
CPC ........ *B60W 60/0015* (2020.02); *B60W 40/04* (2013.01); *B60W 40/06* (2013.01); *B60W 2555/20* (2020.02)

(58) Field of Classification Search
CPC .... G05D 1/0221; G05D 1/0289; G06N 20/00; B60W 30/0956; G06K 9/6257
See application file for complete search history.

(56) References Cited

U.S. PATENT DOCUMENTS

| 11,377,120 | B1* | 7/2022 | Deng | ................ | B60W 30/0956 |
| 2012/0046802 | A1* | 2/2012 | Inou | ................... | B60W 30/0956 701/1 |
| 2012/0130561 | A1* | 5/2012 | Chiang | .................. | G08G 1/165 701/1 |
| 2012/0143488 | A1* | 6/2012 | Othmezouri | ........... | G06V 20/58 701/301 |

(Continued)

*Primary Examiner* — Ramsey Refai
(74) *Attorney, Agent, or Firm* — Fish & Richardson P.C.

(57) ABSTRACT

An example autonomous driving control method is provided, including determining a current driving preference mode from a plurality of driving preference modes. A current environment risk level can be determined from a plurality of environment risk levels A current group of driving parameter values can be selected from a plurality of preset groups of driving parameter values based on the current driving preference mode and the current environment risk level, where the current group of driving parameter values corresponds to the current driving preference mode and the current environment risk level Each of the plurality of preset groups of driving parameter values can include at least one driving parameter value, and each preset group of driving parameter values can correspond to a driving preference mode of the plurality of driving preference modes and an environment risk level of the plurality of environment risk levels.

20 Claims, 9 Drawing Sheets

(56) References Cited

U.S. PATENT DOCUMENTS

| | | | |
|---|---|---|---|
| 2012/0288151 A1* | 11/2012 | Kido | G08G 1/166 |
| | | | 382/103 |
| 2015/0344030 A1* | 12/2015 | Damerow | G06V 20/588 |
| | | | 701/1 |
| 2018/0052458 A1 | 2/2018 | Tsuji et al. | |
| 2018/0203451 A1 | 7/2018 | Cronin et al. | |
| 2019/0283745 A1* | 9/2019 | Nagel | G08G 1/0112 |
| 2020/0017124 A1* | 1/2020 | Camhi | B60W 60/0053 |

* cited by examiner

AUTONOMOUS DRIVING CONTROL METHOD AND APPARATUS

CROSS-REFERENCE TO RELATED APPLICATIONS

This application is a continuation of International Application No. PCT/CN2021/107468, filed on Jul. 20, 2021, which claims priority to Chinese Patent Application No. 202010754688.8, filed on Jul. 31, 2020. The disclosures of the aforementioned applications are hereby incorporated by reference in their entireties.

TECHNICAL FIELD

This application relates to the field of autonomous driving technologies, and in particular, to an autonomous driving control method and an apparatus.

BACKGROUND

An autonomous driving technology relies on cooperation of computer vision, a radar, a monitoring apparatus, a global positioning system, and the like, so that a motor vehicle can implement autonomous driving without active manual operations. An autonomous vehicle uses various computing systems to assist in transporting a passenger from one location to another location. Some autonomous vehicles may require some initial or continuous input from operators (such as navigators, drivers, or passengers). The autonomous vehicle allows the operator to switch from a manual operation mode to an autonomous driving mode or a mode between the manual operation mode and the autonomous driving mode. Because the autonomous driving technology does not require a human to drive the motor vehicle, driving errors caused by people can be effectively avoided in theory, traffic accidents can be reduced, and road transportation efficiency can be improved. Therefore, the autonomous driving technology attracts increasing attention.

Currently, fully autonomous vehicles are not popularized, but an assisted driving function or a partial autonomous driving function are gradually embedded into current vehicles, including common functions such as adaptive cruise control (Adaptive Cruise Control, ACC), automatic emergency braking (Automatic Emergency Braking, AEB), forward collision warning (Forward Collision Warning, FCW), or lane department warning (Lane Department Warning, LDW)

To meet different driving habits of each driver and adapt to a complex driving environment, currently, in the conventional technology, a technical solution in which mathematical modeling may be performed based on a driver preference, an environment status, and another factor, to calculate driving parameters in real time is proposed. However, it is inevitable that real-time calculation through mathematical modeling is delayed, which may cause dangers.

SUMMARY

Embodiments of this application provide an autonomous driving control method and an apparatus, to reduce driving control complexity while ensuring safety of an autonomous driving function.

To achieve the foregoing objectives, the following technical solutions are used in embodiments of this application.

According to a first aspect, an autonomous driving control method is provided. The method includes: determining a current driving preference mode from a plurality of driving preference modes, where the plurality of driving preference modes reflect different driving preferences of a driver; determining a current environment risk level from a plurality of environment risk levels, where the plurality of environment risk levels reflect degrees of impact of different driving environments on autonomous driving safety; and selecting a current group of driving parameter values from a plurality of preset groups of driving parameter values based on the current driving preference mode and the current environment risk level, where the current group of driving parameter values corresponds to the current driving preference mode and the current environment risk level; and each of the plurality of groups of driving parameter values includes at least one driving parameter value, and each group of driving parameter values corresponds to one of the plurality of driving preference modes and one of the plurality of environment risk levels.

In the foregoing technical solution, the current group of driving parameter values is directly selected from the plurality of preset groups of driving parameter values, so that an autonomous driving control system does not need to perform a large amount of complex calculation, and implementation complexity of the driving control system is reduced while safety of an autonomous driving function is met. For example, when the control method is applied to an edge chip, for example, a vehicle-mounted chip, a common problem of insufficient computing resources of the edge chip is resolved.

In a possible implementation of the first aspect, before the selecting a current group of driving parameter values from a plurality of preset groups of driving parameter values based on the current driving preference mode and the current environment risk level, the method further includes: determining at least one driving parameter type used to represent an autonomous driving function; and determining a plurality of preset groups of driving parameter values corresponding to the at least one driving parameter type.

In the foregoing possible implementation, before the control system determines a type of a characterization parameter of the autonomous driving function, the driver needs to select or trigger a corresponding autonomous driving function. The driver may select at least one autonomous driving function, for example, the driver may choose to enable an ACC function in a current driving process, so that personalized requirements of the driver for different autonomous driving functions are met.

The autonomous driving function includes at least one of the following: adaptive cruise control (Adaptive Cruise Control, ACC), automatic emergency braking (Automatic Emergency Braking, AEB), forward collision warning (Forward Collision Warning, FCW), lane department warning (Lane Department Warning, LDW), traffic-jam pilot (Traffic-jam Pilot, TJP), or highway pilot (Highway Pilot, HWP).

In a possible implementation of the first aspect, before the determining a current environment risk level from a plurality of environment risk levels, the method further includes: receiving environment information collected by a sensor; and determining the current environment risk level from the plurality of environment risk levels based on the environmental information. The environment information includes at least one of the following: a curve, weather, road construction, or road accident situation.

In the foregoing possible implementation, the sensor is used to collect the environment information, which increases real-time performance of data, so that the control system determines the environment information more accurately. Especially, environment information is collected by using a sensor on the current vehicle, which increases data privacy, so that the method can be used in remote areas where there is no network In a possible implementation of the first aspect, before the determining a current environment risk level from a plurality of environment risk levels, the method further includes: receiving a notification message sent by a communication device, where the notification message includes indication information of the current environment risk level; and the determining a current environment risk level from a plurality of environment risk levels includes: determining the current environment risk level from the plurality of environment risk levels based on the indication information.

In the foregoing possible implementation, information collected by another vehicle may be shared, a configuration limitation of the sensor on the current vehicle is not depended on, and a calculation amount of the edge chip on the current vehicle is reduced.

In a possible implementation of the first aspect, after the selecting a current group of driving parameter values from a plurality of preset groups of driving parameter values based on the current driving preference mode and the current environment risk level, the method further includes: controlling traveling of a vehicle based on the current group of driving parameter values. In the foregoing possible implementation, the vehicle can update the driving parameters in real time, to improve driving safety.

In a possible implementation of the first aspect, after the receiving environment information collected by a sensor, the method further includes: identifying a feature of the environment information. The step of determining the current environment risk level from the plurality of environment risk levels based on the environmental information is specifically determining the current environment risk level from the plurality of environment risk levels based on the feature of the environment information. In the foregoing possible implementation, the current environment risk level is determined by identifying the feature of the environment information, which accelerates a calculation speed of a calculation element.

In a possible implementation of the first aspect, traveling of the vehicle is controlled based on the current group of driving parameter values. In the foregoing possible implementation, the traveling of the vehicle is directly controlled, and is more flexible, without depending on a network.

In a possible implementation of the first aspect, the current group of driving parameter values is sent to the vehicle, where the current group of driving parameter values is used to control traveling of the vehicle. In the foregoing possible implementation, calculation is performed by using a network, calculation resources are abundant, and a speed is fast.

According to a second aspect, an autonomous driving control apparatus is provided. The apparatus includes: a first determining unit, configured to determine a current driving preference mode from a plurality of driving preference modes, where the plurality of driving preference modes reflect different driving preferences of a driver; a second determining unit, configured to determine a current environment risk level from a plurality of environment risk levels, where the plurality of environment risk levels reflect degrees of impact of different driving environments on autonomous driving safety; and a selection unit, configured to select a current group of driving parameter values from a plurality of preset groups of driving parameter values based on the current driving preference mode and the current environment risk level, where the current group of driving parameter values corresponds to the current driving preference mode and the current environment risk level; and each of the plurality of groups of driving parameter values includes at least one driving parameter value, and each group of driving parameter values corresponds to one of the plurality of driving preference modes and one of the plurality of environment risk levels.

In a possible implementation of the second aspect, the selection unit is specifically configured to: determine at least one driving parameter type used to represent an autonomous driving function; and determine a plurality of preset groups of driving parameter values corresponding to the at least one driving parameter type.

The autonomous driving function includes at least one of the following: adaptive cruise control (Adaptive Cruise Control, ACC), automatic emergency braking (automatic Emergency Braking, AEB), forward collision warning (Forward Collision Warning, FCW) or lane department warning (Lane Department Warning, LDW), traffic-jam pilot (Traffic-jam Pilot, TJP), or highway pilot (Highway Pilot, HWP).

In a possible implementation of the second aspect, the apparatus further includes a receiving unit. The receiving unit is configured to receive environment information collected by a sensor. The second determining unit is specifically configured to determine the current environment risk level from the plurality of environment risk levels based on the environment information. The environment information includes at least one of the following: a curve, weather, road construction, or road accident situation.

In a possible implementation of the second aspect, the apparatus further includes an identification unit, configured to identify a feature of the environment information. The second determining unit is specifically configured to determine the current environment risk level from the plurality of environment risk levels based on the feature of the environmental information.

In a possible implementation of the second aspect, the apparatus further includes a receiving unit, configured to receive a notification message sent by a communication device, and the notification message includes indication information of the current environment risk level. The determining a current environment risk level from a plurality of environment risk levels includes: determining the current environment risk level from the plurality of environment risk levels based on the indication information.

In a possible implementation of the second aspect, the apparatus further includes a controlling unit, configured to control a traveling of a vehicle based on the current group of driving parameter values.

In a possible implementation of the second aspect, the apparatus further includes a controlling unit, configured to send the current group of driving parameter values to a vehicle, where the current group of driving parameter values is used to control traveling of the vehicle.

According to a third aspect, a computer-readable storage medium is provided. The storage medium stores a computer program, and the computer program is used to perform the autonomous driving control method provided in any one of the first aspect or the possible implementations of the first aspect.

According to a fourth aspect, an electronic device is provided. The electronic device includes: a processor; and a memory configured to store processor-executable instructions. The processor is configured to perform the autonomous driving control method provided in any one of the first aspect or the possible implementations of the first aspect.

According to a fifth aspect, a computer program product is provided. When the computer program product is run on a computer, the computer is enabled to perform the driving parameter determining method provided in any one of the first aspect or the possible implementations of the first aspect.

According to a sixth aspect, a chip is provided, including a processor and an interface. The interface is configured to read processor-executable instructions from an external memory. The processor is configured to perform the autonomous driving control method provided in any one of the first aspect or the possible implementations of the first aspect.

According to a seventh aspect, a vehicle is provided. The vehicle is configured to perform the autonomous driving control method provided in any one of the first aspect or the possible implementations of the first aspect.

According to an eighth aspect, a server is provided. The server is configured to perform the autonomous driving control method provided in any one of the first aspect or the possible implementations of the first aspect.

It may be understood that any one of the autonomous driving control apparatus, the computer-readable storage medium, the electronic device, and the computer program product provided above may be implemented by using the corresponding method provided above. Therefore, for beneficial effects that can be achieved, refer to beneficial effects in the corresponding method provided above. Details are not described herein again.

DESCRIPTION OF EMBODIMENTS

The following describes the technical solutions in embodiments of this application with reference to the accompanying drawings in embodiments of this application. It is clear that the described embodiments are merely a part rather than all of embodiments of this application. All other embodiments obtained by a person of ordinary skill in the art based on embodiments of this application without creative efforts shall fall within the protection scope of this application.

Figure 1:
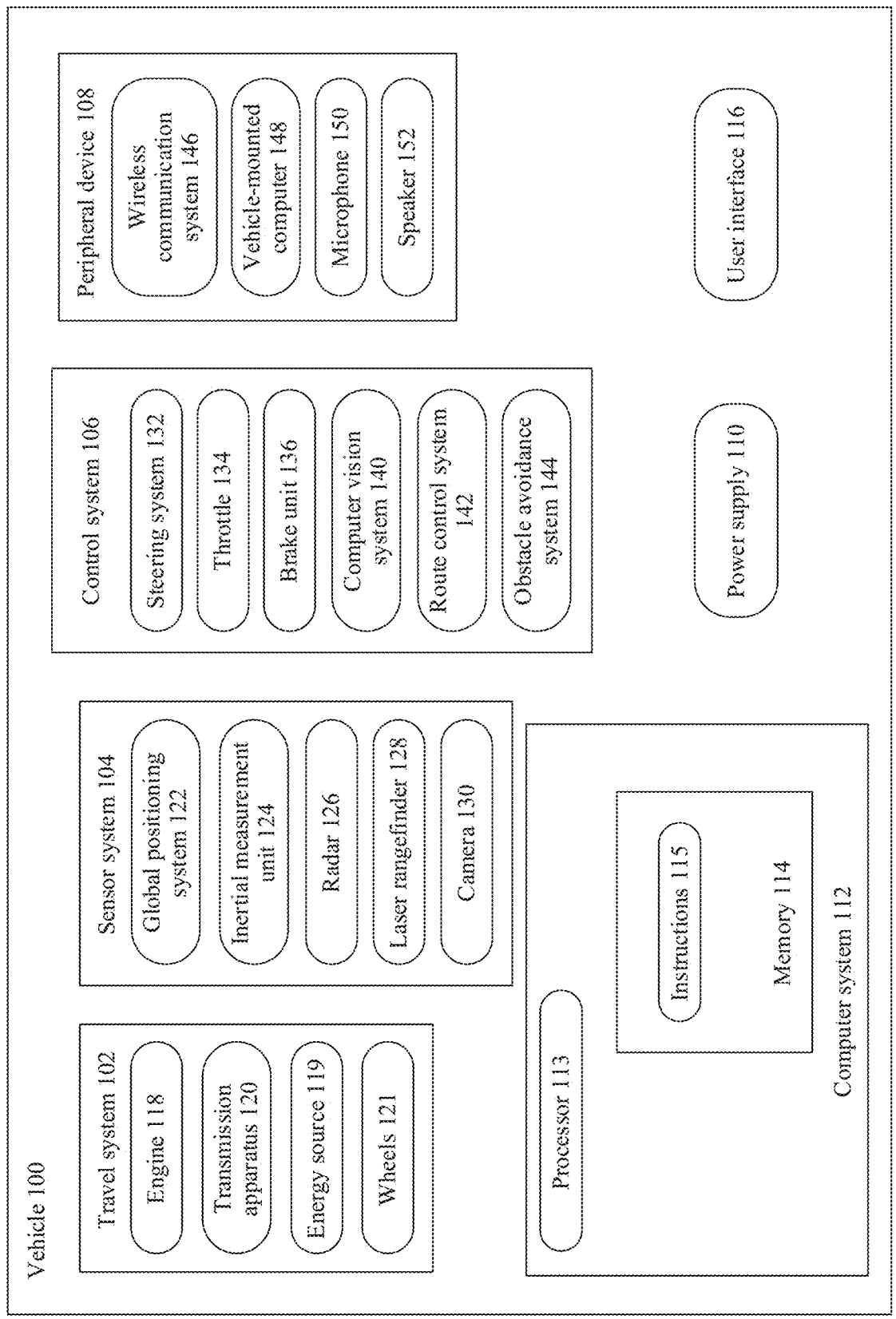
FIG. 1 is a functional block diagram of a vehicle having an autonomous driving function according to an embodiment of this application.

According to autonomous driving technology classification standards proposed by the International Society of Automotive Engineers (SAE for short), autonomous driving in this application corresponds to autonomous driving at levels L0 to L5. In this embodiment of this application, a vehicle 100 is configured to be in an assisted driving mode or an autonomous driving mode. FIG. 1 is a functional block diagram of a vehicle 100 according to an embodiment of this application.

The vehicle 100 may include various subsystems, for example, a travel system 102, a sensor system 104, a control system 106, one or more peripheral devices 108, a power supply 110, a computer system 112, and a user interface 116. Optionally, the vehicle 100 may include more or fewer subsystems, and each subsystem may include a plurality of elements. In addition, all the subsystems and elements of the vehicle 100 may be interconnected in a wired or wireless manner.

The travel system 102 may include a component providing power to the vehicle 100 for moving. In an embodiment, the travel system 102 may include an engine 118, an energy source 119, a transmission apparatus 120, and wheels/tires 121. The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy.

Examples of the energy source 119 include gasoline, diesel, other oil-based fuels, propane, other compressed gas-based fuels, ethanol, solar panels, batteries, and other power sources. The energy source 119 may also provide energy to another system of the vehicle 100.

The transmission apparatus 120 may transmit mechanical power from the engine 118 to the wheels 121. The transmission apparatus 120 may include a gearbox, a differential, and a drive shaft. In an embodiment, the transmission apparatus 120 may further include another component, for example, a clutch. The drive shaft may include one or more shafts that may be coupled to one or more wheels 121.

The sensor system 104 may include several sensors that can sense information about an ambient environment of the vehicle 100. For example, the sensor system 104 may include a positioning system 122 (the positioning system may be a GPS system, a BeiDou system, or another positioning system), an inertial measurement unit (inertial measurement unit, IMU) 124, a radar 126, a laser rangefinder 128, and a camera 130. The sensor system 104 may further include a sensor (for example, an in-vehicle air quality monitor, a fuel gauge, or an engine oil thermometer) of an internal system of the monitored vehicle 100. Sensor data from one or more of these sensors can be used to detect an object and corresponding features (a position, a shape, a direction, a speed, and the like) of the object. Such detection and recognition are key functions of a safe operation of the autonomous vehicle 100.

The positioning system 122 may be configured to estimate a geographic location of the vehicle 100. The IMU 124 is configured to sense a position and an orientation change of the vehicle 100 based on an inertial acceleration. In an embodiment, the IMU 124 may be a combination of an accelerometer and a gyroscope.

The radar 126 may sense an object in the ambient environment of the vehicle 100 through a radio signal. In some embodiments, in addition to sensing an object, the radar 126 may further be configured to sense a speed and/or a moving direction of the object.

The laser rangefinder 128 may sense, by using a laser, an object in an environment in which the vehicle 100 is located. In some embodiments, the laser rangefinder 128 may include one or more laser sources, a laser scanner, one or more detectors, and another system component.

The camera 130 may be configured to capture a plurality of images of the ambient environment of the vehicle 100. The camera 130 may be a static camera or a video camera.

The control system 106 controls operations of the vehicle 100 and components of the vehicle 100. The control system 106 may include various elements, including a steering system 132, a throttle 134, a brake unit 136, a sensor fusion algorithm 138, a computer vision system 140, a route control system 142, and an obstacle avoidance system 144.

The steering system 132 may be operated to adjust a moving direction of the vehicle 100. For example, in an embodiment, the steering system 132 may be a steering wheel system.

The throttle 134 is configured to control an operating speed of the engine 118 and further control a speed of the vehicle 100.

The brake unit 136 is configured to control the vehicle 100 to decelerate. The brake unit 136 may use friction to slow down the wheels 121. In another embodiment, the brake unit 136 may convert kinetic energy of the wheels 121 into a current. Alternatively, the brake unit 136 may reduce a rotational speed of the wheels 121 in another form to control the speed of the vehicle 100.

The computer vision system 140 may be operated to process and analyze an image captured by the camera 130, to recognize an object and/or a feature in the ambient environment of the vehicle 100. The object and/or the feature may include a traffic signal, a road boundary, and an obstacle. The computer vision system 140 may use an object recognition algorithm, a structure from motion (Structure from Motion, SFM) algorithm, video tracking, and another computer vision technology. In some embodiments, the computer vision system 140 may be configured to draw a map for an environment, track an object, estimate a speed of the object, and the like.

The route control system 142 is configured to determine a driving route of the vehicle 100. In some embodiments, the route control system 142 may combine data from the sensor 138, the GPS 122, and one or more predetermined maps to determine the driving route of the vehicle 100.

The obstacle avoidance system 144 is configured to identify, evaluate, and avoid or bypass a potential obstacle in the environment of the vehicle 100 in another manner.

Certainly, in an example, the control system 106 may add or alternatively include components in addition to those shown and described. Alternatively, the control system 106 may remove some of the components shown above.

The vehicle 100 interacts with an external sensor, another vehicle, another computer system, or a user by using the peripheral device 108. The peripheral device 108 may include a wireless communication system 146, a vehicle-mounted computer 148, a microphone 150, and/or a speaker 152.

In some embodiments, the peripheral device 108 provides a means for the user of the vehicle 100 to interact with the user interface 116. For example, the vehicle-mounted computer 148 may provide information to the user of the vehicle 100. The user interface 116 may further operate the vehicle-mounted computer 148 to receive an input from the user. The vehicle-mounted computer 148 may perform an operation by using a touchscreen. In another case, the peripheral device 108 may provide a means for the vehicle 100 to communicate with another device located in the vehicle. For example, the microphone 150 may receive audio (for example, a voice command or another audio input) from the user of the vehicle 100. Likewise, the speaker 152 may output audio to the user of the vehicle 100.

The wireless communication system 146 may wirelessly communicate with one or more devices directly or through a communication network. For example, the wireless communication system 146 may perform communication through a 3G cellular network such as CDMA, EVDO, or GSM/GPRS, perform communication through a 4G cellular network such as LTE, or perform communication through a 5G cellular network. The wireless communication system 146 may communicate with a wireless local area network (wireless local area network, WLAN) by using Wi-Fi. In some embodiments, the wireless communication system 146 may directly communicate with a device by using an infra-red link, Bluetooth, or ZigBee. Other wireless protocols, for example, various vehicle communication systems, such as the wireless communication system 146, may include one or more dedicated short range communications (dedicated short range communications, DSRC) devices, and these devices may include public and/or private data communication between the vehicle and/or roadside stations.

The power supply 110 may provide power to various components of the vehicle 100. In an embodiment, the power supply 110 may be a rechargeable lithium-ion or lead-acid battery. One or more battery packs of such batteries may be configured as the power supply to supply power to the components of the vehicle 100. In some embodiments, the power supply 110 and the energy source 119 may be implemented together, for example, in some pure electric vehicles.

Some or all of functions of the vehicle 100 are controlled by the computer system 112. The computer system 112 may include at least one processor 113, and the processor 113 executes instructions 115 stored in a non-transient computer-readable medium such as a memory 114. The computer system 112 may alternatively be a plurality of computing devices that control individual components or subsystems of the vehicle 100 in a distributed manner.

The processor 113 may be any conventional processor, for example, a commercially available CPU. Alternatively, the processor may be a dedicated device such as an ASIC or another hardware-based processor. Although FIG. 1 functionally illustrates the processor, the memory, and other elements of a computer 110 in a same block, a person of ordinary skill in the art should understand that the processor, the computer, or the memory may actually include a plurality of processors, computers, or memories that may or may not be stored in a same physical housing. For example, the memory may be a hard disk drive, or another storage medium located in a housing different from that of the computer 110. Thus, it is understood that a reference to the processor or the computer includes a reference to a set of processors or computers or memories that may or may not operate in parallel. Different from using a single processor to perform the steps described herein, some components, such as a steering component and a deceleration component, each may include a respective processor that performs only computation related to a component-specific function.

In various aspects described herein, the processor may be located far away from the vehicle and communicate wirelessly with the vehicle. In another aspect, some processes described herein are performed on a processor disposed inside the vehicle, while others are performed by a remote processor, including taking steps necessary for single manipulation.

In some embodiments, the memory 114 may include the instructions 115 (for example, program logic), and the instructions 115 may be executed by the processor 113 to perform various functions of the vehicle 100, including the functions described above. The memory 114 may also include additional instructions, including instructions used to send data to, receive data from, interact with, and/or control one or more of the travel system 102, the sensor system 104, the control system 106, and the peripheral device 108.

In addition to the instructions 115, the memory 114 may further store data, such as a road map, route information, a location, a direction, a speed, and other such vehicle data of a vehicle, and other information. Such information may be used by the vehicle 100 and the computer system 112 when the vehicle 100 operates in an autonomous mode, a semi-autonomous mode, and/or a manual mode.

The user interface 116 is used to provide information for or receive information from the user of the vehicle 100. Optionally, the user interface 116 may include one or more input/output devices in a set of peripheral devices 108, such as the wireless communication system 146, the vehicle-mounted computer 148, the microphone 150, and the speaker 152.

The computer system 112 may control functions of the vehicle 100 based on input received from various subsystems (for example, the travel system 102, the sensor system 104, and the control system 106) and from the user interface 116. For example, the computer system 112 may access and use input from the control system 106 to control the steering unit 132 to avoid an obstacle detected by the sensor system 104 and the obstacle avoidance system 144. In some embodiments, the computer system 112 may be operated to provide control over many aspects of the vehicle 100 and the subsystems of the vehicle 100.

Optionally, one or more of the foregoing components may be installed separately from or associated with the vehicle 100. For example, the memory 114 may exist partially or completely separate from the vehicle 100. The foregoing components may be communicatively coupled together in a wired and/or wireless manner.

Optionally, the foregoing components are merely examples. In actual application, components in the foregoing modules may be added or deleted based on an actual requirement. FIG. 1 should not be understood as any limitation on this embodiment of this application.

A vehicle traveling on a road, such as the vehicle 100, may identify an object in an ambient environment of the vehicle 100 to determine to adjust a current speed. The object may be another vehicle, a traffic control device, or another object of another type. In some examples, the vehicle may separately consider each identified object, and determine an adjusted speed of the vehicle based on features of the object such as a current speed, an acceleration, and a distance between the vehicle and the object.

Optionally, the vehicle 100 or the computing device associated with the vehicle 100 (such as the computer system 112, the computer vision system 140, and the memory 114 in FIG. 1) may predict behavior of an identified object based on features of the identified object and statuses of the ambient environment (for example, traffic, rain, or ice on the road). Optionally, each of the identified objects depends on behavior of each other, and therefore all the identified objects may be considered together to predict behavior of a single identified object. The vehicle 100 can adjust the speed of the vehicle 100 based on the predicted behavior of the identified object. In other words, the autonomous vehicle can determine, based on the predicted behavior of the object, a stable state to which the vehicle needs to be adjusted (for example, acceleration, deceleration, or stop). In this process, another factor, for example, a transverse location of the vehicle 100 on a road on which the vehicle 100 moves, a curvature of the road, or proximity between static and dynamic objects, may also be considered, to determine the speed of the vehicle 100.

In addition to providing an instruction for adjusting the speed of the autonomous vehicle, the computing device may further provide an instruction for modifying a steering angle of the vehicle 100, so that the autonomous vehicle can follow a given lane and/or maintain safe horizontal and vertical distances from an object (for example, a car in a neighboring lane on the road) near the vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of this application.

After the vehicle 100 is described, the following describes an autonomous driving computer system in this application.

Figure 2:
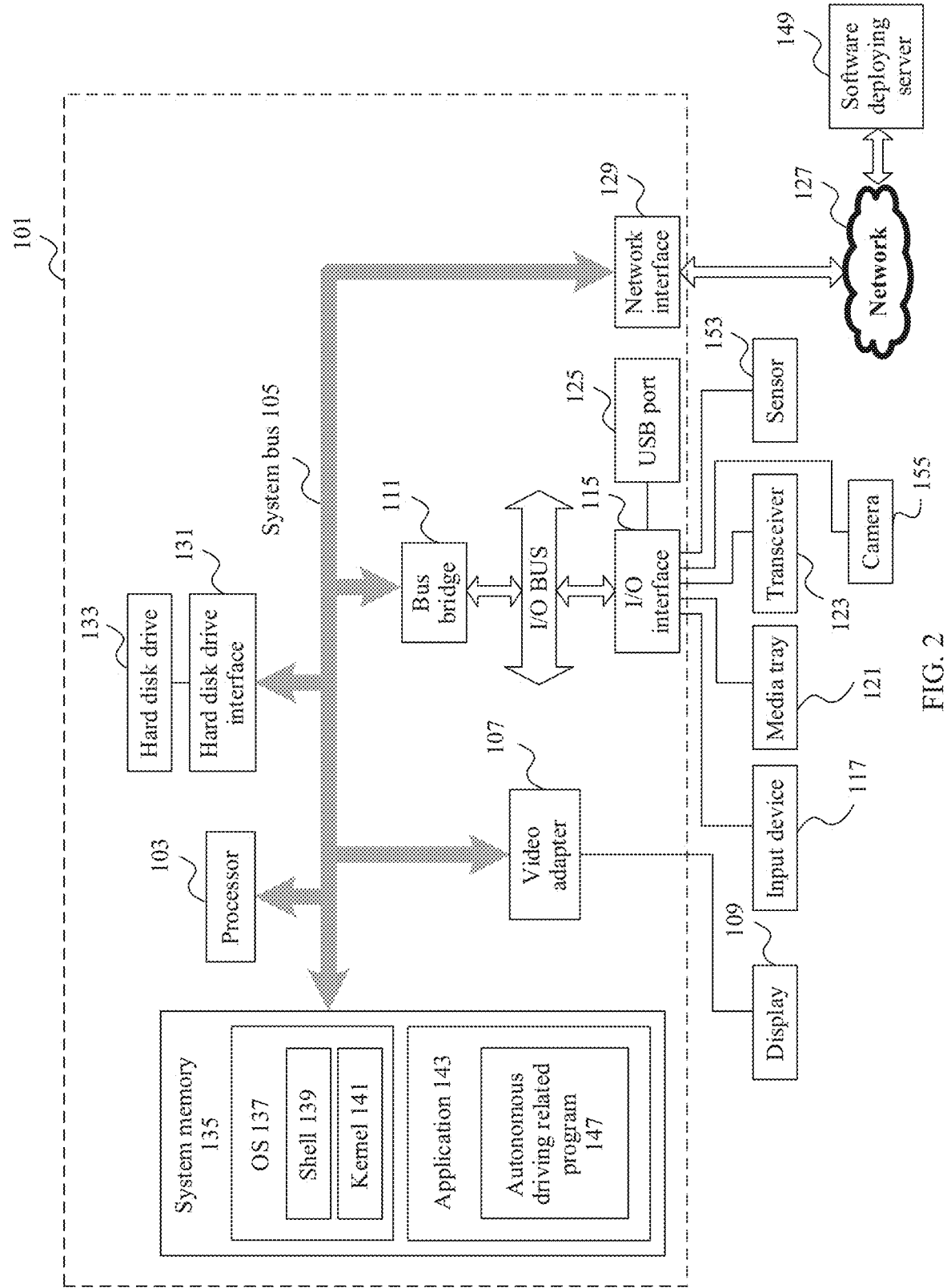
FIG. 2 is a schematic diagram of a structure of an autonomous driving computer system according to an embodiment of this application.

According to FIG. 2, a computer system 101 includes a processor 103, and the processor 103 is coupled to a system bus 105. The processor 103 may be one or more processors, and each processor may include one or more processor cores. The computer system 101 also includes a video adapter (video adapter) 107, which may drive a display 109, and the display 109 is coupled to the system bus 105. The system bus 105 is coupled to an input/output (I/O) bus 113 through a bus bridge 111. An I/O interface 115 is coupled to the I/O bus. The I/O interface 115 communicates with a plurality of I/O devices, for example, an input device 117 (such as a keyboard, a mouse, and a touchscreen), a media tray (media tray) 121 (such as a CD-ROM and a multimedia interface), a transceiver 123 (which may send and/or receive a radio communication signal), a camera 155 (which may capture static and dynamic digital video images), and an external USB interface 125. Optionally, an interface connected to the I/O interface 115 may be a USB interface.

The processor 103 may be any conventional processor, including a reduced instruction set computing ("RISC") processor, a complex instruction set computing ("CISC") processor, or a combination thereof. Optionally, the processor may be a dedicated apparatus such as an application-specific integrated circuit ("ASIC"). Optionally, the processor 103 may be a neural network processor or a combination of the neural network processor and the foregoing conventional processor.

Optionally, in various embodiments described herein, the computer system 101 may be located away from an autonomous vehicle, and may wirelessly communicate with the autonomous vehicle. In another aspect, some of processes described herein are performed on a processor disposed in the autonomous vehicle, and others are performed by a remote processor, including taking an action required to perform a single manipulation.

The computer 101 may communicate with a software deploying server 149 by using a network interface 129. The network interface 129 is a hardware network interface, such as a network interface card. A network 127 may be an external network, such as the Internet; or may be an internal network, such as the Ethernet or a virtual private network (VPN). Optionally, the network 127 may alternatively be a wireless network, for example, a Wi-Fi network or a cellular network.

A hard disk drive interface is coupled to the system bus 105. The hard disk drive interface is connected to a hard disk drive. A system memory 135 is coupled to the system bus 105. Data running in the system memory 135 may include an operating system 137 of the computer 101 and an application 143.

The operating system includes a shell 139 and a kernel (kernel) 141. The shell 139 is an interface between a user and the kernel (kernel) of the operating system. The shell is an outermost layer of the operating system. The shell manages interaction between the user and the operating system: waiting for input of the user, interpreting the input of the user for the operating system, and processing various outputs of the operating system.

The kernel 141 includes components of the operating system that are configured to manage a memory, a file, a peripheral, and a system resource. The kernel 141 directly interacts with hardware. The kernel of the operating system usually runs processes, provides inter-process communication, and provides CPU time slice management, interruption, memory management, I/O management, and the like.

The application 143 includes a program related to controlling autonomous driving of the vehicle, for example, a program controlling a route or a speed of the vehicle. The application 143 also exists on a system of the deploying server 149. In one embodiment, when the application 141 needs to be executed, the computer system 101 may download the application 141 from the deploying server 14.

The application 143 in this application is an assisted driving function application, a partial autonomous driving function application, or a fully autonomous driving function application. Autonomous driving functions at an L2 level or below (that is, an assisted driving function commonly referred to in the art) includes: adaptive cruise control (Adaptive Cruise Control, ACC), automatic emergency braking (Automatic Emergency Braking, AEB), forward collision warning (Forward Collision Warning, FCW), lane department warning (Lane Department Warning, LDW), and the like. Autonomous driving functions at an L3 level or above include: traffic-jam pilot (Traffic-jam Pilot, TJP), or highway pilot (Highway Pilot, HWP), or the like. Details are as follows:

Adaptive cruise control (Adaptive Cruise Control, ACC): When a vehicle is driving, an inter-vehicle distance sensor (radar) disposed in the front of the vehicle continuously scans a road in front of the vehicle, and a wheel speed sensor collects a vehicle speed signal. When a distance between the vehicle and a vehicle in front of the vehicle is small, an ACC control unit may coordinate actions with an anti-lock braking system and an engine control system to properly brake wheels and reduce output power of an engine, so that the vehicle can always keep a safe distance with the vehicle in front of the vehicle. When controlling vehicle braking, an adaptive cruise control system usually limits a braking deceleration to a degree of no comfort loss. When a larger deceleration is required, the ACC control unit sends an audible and visual signal to indicate a driver to actively take a braking operation. When the distance between the vehicle and the vehicle in front of the vehicle increases to a safe distance, the ACC control unit controls the vehicle to travel at a set speed.

For an adaptive cruise control ACC function characterization parameter, a parameter of time headway (Time Headway, THW) is usually used for representation. If a long distance is required, the time headway THW is set to a larger value.

Automatic emergency braking (Automatic Emergency Braking, AEB): The automatic emergency braking is an active safety technology for automobiles. The automatic emergency braking consists of three modules: a control module (ECU), a ranging module, and a braking module. The AEB system uses a radar to measure a distance between the AEB system and a vehicle or an obstacle in front of the AEB system. Then, the AEB system uses a data analysis module to compare the measured distance with a warning distance and a safety distance. If the measured distance is less than the warning distance, the AEB system generates a warning. When the measured distance is less than the safe distance, the AEB system starts even if a driver does not have time to step on a brake pedal, to automatically brake the vehicle, so as to safeguard safe travel.

Forward collision warning (Forward Collision Warning, FCW): The forward collision warning monitors a vehicle in front of an ego vehicle, determines a distance, a position, and a speed of the ego vehicle relative to the vehicle in front of the ego vehicle, and warns a driver of a potential collision risk. This system reduces a missed warning rate and a false warning rate based on status information of a bus of the vehicle.

For automatic emergency braking AEB and forward collision warning FCW function characterization parameters, a time-to-collision TTC (Time-to-Collision) may be used for representation. When early triggering is required, a longer reserved time indicates a larger set time-to-collision TTC. In addition, a time-to-brake (Time-to-Brake, TTB) is also considered to be used for representation in braking processing. When early triggering is required, a longer reserved time indicates a larger set TTB.

Lane department warning (Lane Department Warning, LDW): The lane department warning is used to assist a driver in automatically keeping a vehicle within a lane. The lane department warning is mainly used to notify the driver of a behavior that the driver deviates from the lane due to fatigue, and help the vehicle run in a safe driving state. The LDW system uses a camera sensor to collect image information and a vehicle-mounted sensor to collect other vehicle status information. After real-time image processing, the LDW system provides lane departure warning information.

For a lane department warning LDW function characterization parameter, a time-to-lane-crossing TTLC (Time-to-Lane-Crossing) may be used for representation. When early triggering is required, a longer reserved time indicates a larger set time-to-lane-crossing TTLC.

A traffic-jam pilot (Traffic-jam Pilot, TJP) function enables a driver to release hands and feet on a congested highway or urban expressway and shift attention from a driving environment for a long time, to do activities such as watching a mobile phone, answering a phone call, and viewing landscapes. A maximum driving speed under this system is 40-60 kph.

A highway pilot (Highway Pilot, HWP) function refers to a function same as the TJP on a common smooth highway or urban expressway. A minimum driving speed under this system is 60 kph.

It should be noted that, in the scientific research field, mathematical modeling is performed on a road environment condition and a driver's personal preference. Parameters are set for different risk levels and different personal preferences, to calculate an autonomous driving parameter value. However, when a mathematical model is applied to a real vehicle, a real-time calculation complexity is high, a delay is inevitable, and there are risks.

Based on this, embodiments of this application provide an autonomous driving control method and an apparatus. A driver performs preference selection, and directly selects a preset driving parameter with reference to a risk level, without performing complex real-time calculation. This improves security of an autonomous driving function, and meets personalized and low complexity requirements.

An autonomous driving control system provided in this embodiment of this application may be located on a side of a vehicle, or may be located on a cloud. Specifically, a computer system in the vehicle or in a cloud server may perform a related function. The following provides description separately.

Figure 3:
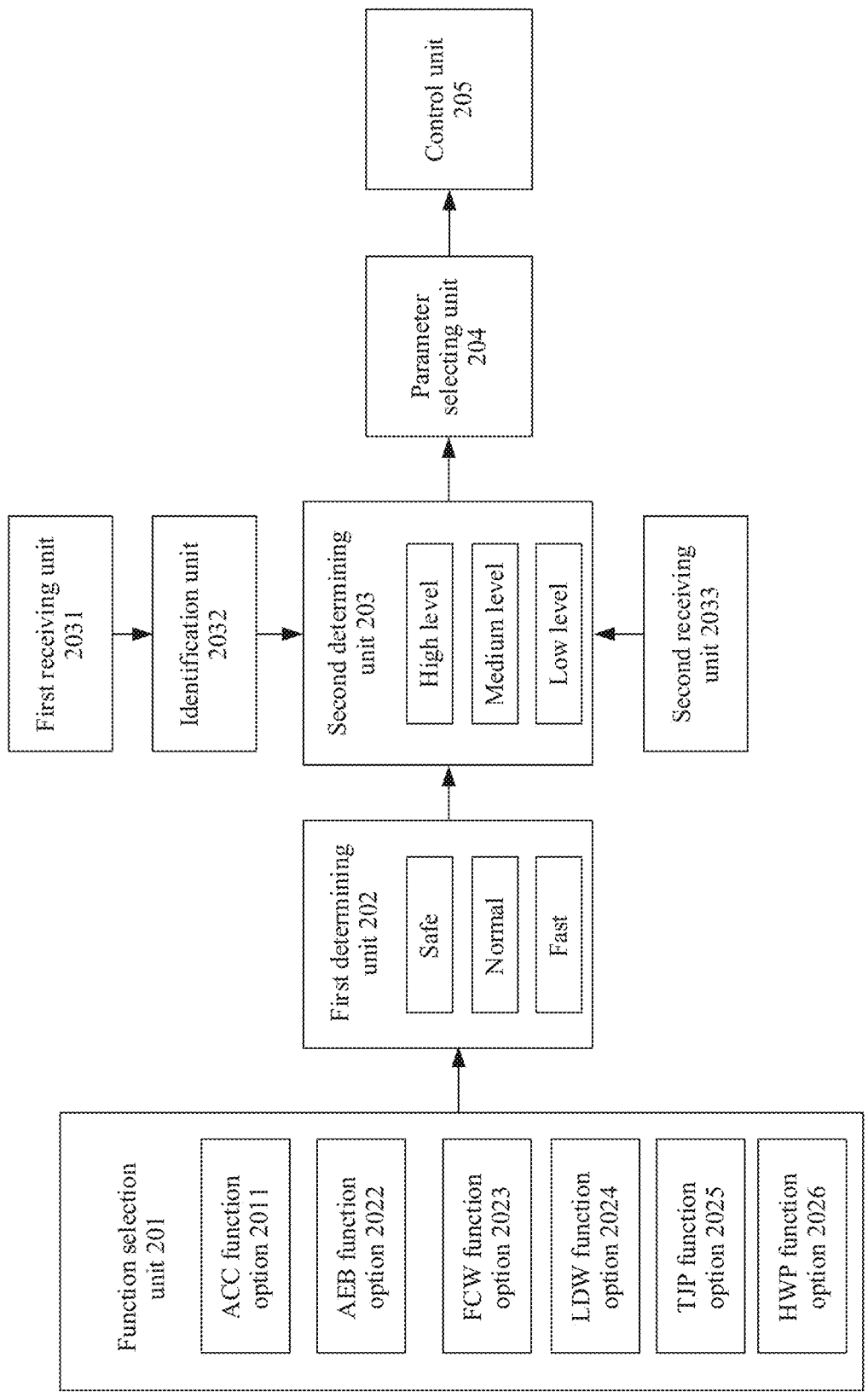
FIG. 3 is a schematic diagram of a structure of an autonomous driving control system with instructions from a vehicle side according to an embodiment of this application.

FIG. 3 is a schematic diagram of a structure of an autonomous driving control system with instructions from a vehicle side according to an embodiment of this application. The autonomous driving control system includes: a function selection unit 201, a first determining unit 202, a second determining unit 203, a parameter selection unit 204, a control unit 205, a first receiving unit 2031, an identification unit 2032, and a second receiving unit 2033.

The function selection unit 201 specifically includes an ACC function option 2011, an AEB function option 2022, an FCW function option 2023, an LDW function option 2024, a TJP function option 2025, and an HWP function option 2026. The foregoing function options may be implemented as hardware components such as buttons, or may be implemented on a touchscreen, and a driver may select a function by using the button or the touchscreen. For example, a button of the ACC function option may be a button or a lever disposed on a steering wheel.

The first determining unit 202 may independently set a preference mode option for each of the foregoing function options, or may set a unified preference mode option, or may integrate the unified preference mode option into an existing driving mode option. The autonomous driving control system may determine a preference mode by selecting a preference mode option by the driver.

The driver's personal preference comprehensively reflects the driver's time and speed preference, driving capability, ability to withstand security threats, physical condition, and purpose of a current trip, for example, whether the driver is commuting or going to an outing.

For each of the foregoing function options, a corresponding preference mode option may be separately set. The foregoing function options may be implemented as hardware components such as buttons, or may be displayed on the touchscreen, and the driver performs function selection. For example, the ACC function option may be three options: long headway, medium headway, and short headway. The AEB function option, the FCW function option, and the LDW function option may be set to two options: normal duration and short duration, or may be set to three options: long duration, normal duration, and short duration. A quantity of options is not limited herein, and the foregoing is only an example.

The unified preference mode option may be uniformly set to two or three options for various autonomous driving function types, for example, normal and fast, or safe, normal, and fast. For the ACC, safe corresponds to a long headway option, normal corresponds to a medium headway option, and fast corresponds to a short headway option. For the AEB, the FCW, and the LDW, safe corresponds to the long duration, normal corresponds to the normal duration, and fast corresponds to the short duration. A plurality of autonomous driving functions are set to the unified preference mode, which can be selected at one time, to reduce operation complexity.

Optionally, a basic preference mode is configured in the system by default, the driver may not perform selection, and the preference mode is a default option of the system. The default option may be a preference mode selected by a same driver last time, or a preference mode collected recently in a same time period, or a preference mode that is more conducive to safe driving. An identity recognition system may be further disposed to recognize an identity of a driver, such as a facial recognition system, a fingerprint recognition system, or an iris recognition system.

Optionally, the foregoing unified preference mode options may be further integrated into the existing driving modes that commonly include comfort, normal, and sports modes. It may be set that the comfort mode corresponds to safe, the normal mode corresponds to normal, and the sports mode corresponds to fast. When selecting the driving mode, the driver also selects the autonomous driving preference mode, to reduce operation steps and improve operation convenience for the driver.

The risk level describes levels of degrees of impact of different driving environments on autonomous driving safety, and may be classified into two levels, three levels, or more levels based on an actual requirement. For example, the risk level can be classified into a high risk level, a medium risk level, and a low risk level, or a high risk level and a low risk level.

The second determining unit 203 may perform detection by using the sensor system 104 of the vehicle to obtain an environment condition, and perform identification by using the identification unit 2032, to determine a current environment risk level. The environment risk level in this application may be classification or grading of an environment in which a vehicle travels based on different road environment features, different weather features, road traffic accident statistics features, or the like.

For example, the autonomous driving control system includes the first receiving unit 2031. For example, the first receiving unit 2031 is a sensor interface, and is configured to receive environment information collected by the sensor system 104. The sensor system 104 may collect road environment signals of the vehicle 100 by using various sensors, and the sensor system sends the collected road environment information to the first receiving unit 2031 of the autonomous driving control system.

The identification unit 2032 may be, for example, the computer vision system 140. The computer vision system 140 may process an image collected by the camera 130, an identified road condition (for example, a curve, construction, or congestion), and a status of the ambient environment (for example, weather, rain, or ice on the road). The identification unit 2032 transmits the identified information to the second determining unit 203 to determine the risk level.

Optionally, the second determining unit 203 may further receive, by using the second receiving unit 2033, a notification message sent by the communication device. For example, the second receiving unit 2033 may be a communication element or an RF radio frequency receiver, and the notification message includes indication information of the current environment risk level. The determining a current environment risk level from a plurality of environment risk levels includes: determining the current environment risk level from the plurality of environment risk levels based on the indication information. For example, the second determining unit 203 may receive a notification message sent by a server, another vehicle, or a high-precision map APP vendor. The notification message includes indication information of a current risk level. For example, the indication information may be environment risk level grading information.

The parameter selection unit 204 is configured to select a current group of driving parameter values from a plurality of preset groups of driving parameter values based on a current driving preference mode and the current environment risk level. The current group of driving parameter values corresponds to the current driving preference mode and the current environment risk level.

The parameter selection unit 204 first determines, based on an autonomous driving function option selected by the driver or a system default, a type of at least one characterization parameter corresponding to the autonomous driving function. As shown in the following Table 1, a characterization parameter may be selected to represent an autonomous driving function. For example, a time headway THW may be selected as a characterization parameter of the adaptive cruise control ACC function, a time-to-collision TTC may be selected as a characterization parameter of the automatic emergency braking AEB function and the forward collision warning FCW, a time-to-lane-crossing TTLC may be selected as a characterization parameter of the lane department warning LDW function. Alternatively, a plurality of parameters may be selected to represent an autonomous driving function. For example, for the FCW and AEB functions, in addition to the time-to-collision TTC, a time-to-brake TTB or the like may be further used.

TABLE 1

| Classification of autonomous driving functions | Characterization parameter |
|---|---|
| Adaptive cruise control ACC | Time headway THW and percent of target changing PTC (Percent of Target Changing) |
| Automatic emergency braking AEB | Time-to-collision TTC and time-to-brake TTB |
| Forward collision warning FCW | Time-to-collision TTC and time-to-brake TTB |
| Lane department warning LDW | Time-to-lane-crossing TTLC |
| Traffic-jam pilot TJP | Time headway THW, time-to-collision TTC, and time-to-lane-crossing TTLC |
| Highway pilot HWP | Time headway THW, time-to-collision TTC, and time-to-lane-crossing TTLC |

Then, the parameter selection unit 204 determines, based on the selected characterization parameter type, a plurality of preset groups of driving parameter values corresponding to the characterization parameter. Table 2 is a parameter value table of THW and PTC corresponding to the adaptive cruise control ACC function.

As shown in Table 2, the parameter selection unit 204 may select two characterization parameters corresponding to the ACC function, which are specifically THW and PTC. The two characterization parameters correspond to nine groups of driving parameter values in Table 2. Each group of driving parameter values in parentheses specifically includes two driving parameter values, a quantity of driving parameter values corresponds to a quantity of characterization parameter types. A first value represents THW, and a second value represents PTC. Each group of driving parameter values corresponds to one of the plurality of driving preference modes and one of the plurality of environment risk levels. For example, a group of driving parameter values (1.8, 50%) indicates values of the characterization parameters THW and PTC of the ACC function when the preference mode is safe and the risk level is low.

TABLE 2

| | Environment risk level | | |
|---|---|---|---|
| Driving preference mode | Low | Medium | High |
| Safe | (1.8, 50%) | (2.0, 45%) | (2.2, 40%) |
| Normal | (1.6, 60%) | (1.8, 50%) | (1.9, 45%) |
| Fast | (1.5, 65%) | (1.6, 60%) | (1.7, 55%) |

Optionally, as shown in Table 3, one characterization parameter corresponding to the ACC function may be selected, which is specifically the THW. The characterization parameter THW corresponds to nine groups of driving parameter values in Table 3, and each group of parameter values includes one driving parameter value. The parameter value indicates a value of THW in different driving preference modes and different environment risk levels.

TABLE 3

| | Environment risk level | | |
|---|---|---|---|
| Driving preference mode | Low | Medium | High |
| Safe | 1.8 | 2.0 | 2.2 |
| Normal | 1.6 | 1.8 | 1.9 |
| Fast | 1.5 | 1.6 | 1.7 |

Then, the parameter selection unit 204 selects the current group of driving parameter values from the plurality of preset groups of driving parameter values based on the preference mode determined by the first determining unit 202 and the road environment risk level determined by the second determining unit 203. For example, as shown in Table 2 or Table 3, the parameter selection unit 204 selects a specific parameter value in Table 2 or Table 3 as a current autonomous driving parameter value, depending on whether the preference mode is safe, normal, or fast and whether the risk level is high, medium, or low The plurality of groups of driving parameter values may be stored in a memory in a preset form. The memory may be disposed in a sensing device, a control device, an ECU, an MCU, an MDC, or the like. The preset values may be calculated in advance based on an empirical value or a test result of an existing parameter, or based on a formula.

The control unit 205 controls, based on the current driving parameter selected by the parameter selection unit 204, the steering system 132, the throttle 134, and the brake unit 136 to perform corresponding adjustment.

It should be understood that the units in the foregoing embodiments may be implemented by using hardware, software, or a combination thereof. As shown in FIG. 1, software may be stored in the memory 114 and executed by the processor 113, and hardware may include but is not limited to various types of processing circuits or processors. For example, the function selection unit 201 and the first determining unit 202 may be touchscreens or buttons, and correspond to the input device 117 in FIG. 2. The second determining unit 203, the parameter selection unit 204, and the control unit 205 may be implemented by using software and stored in the application 143 in FIG. 2.

Figure 4:
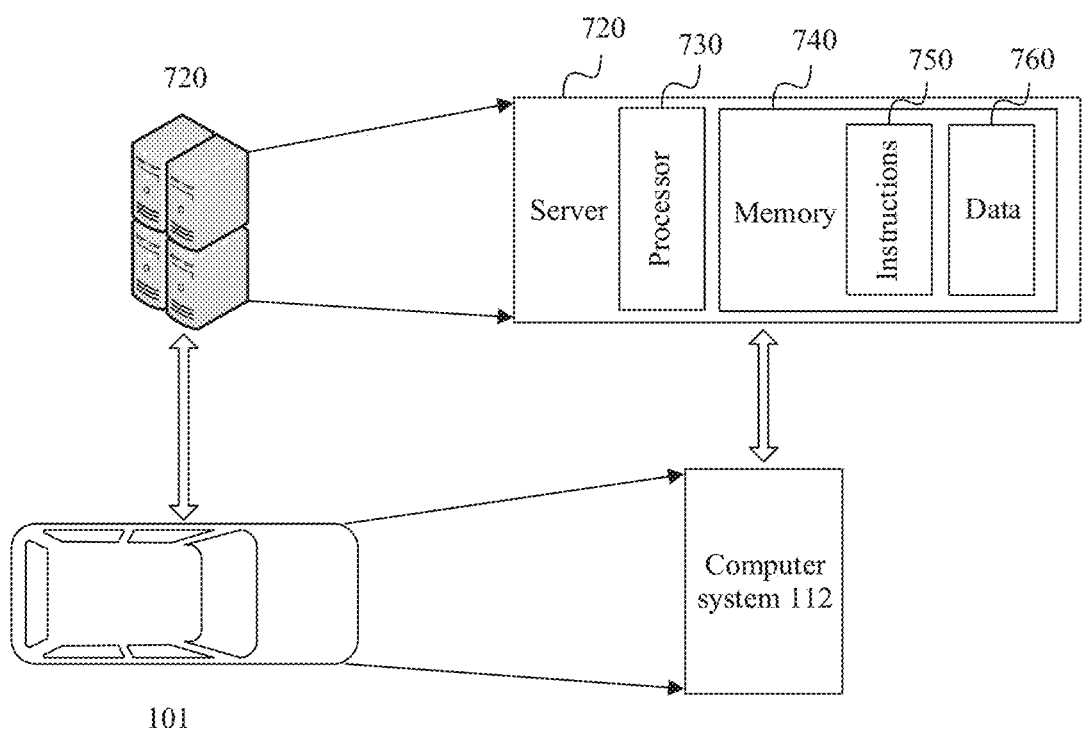
FIG. 4 is a schematic diagram of an application of an autonomous driving control system with instructions from a cloud according to an embodiment of this application.

FIG. 4 is a schematic diagram of an application of an autonomous vehicle with instructions from a cloud according to an embodiment of this application.

The vehicle-mounted computer system 112 may also receive information from or transfer information to another computer system. Alternatively, the sensor data collected by the sensor system 104 of the vehicle 100 may be transferred to another computer for processing. As shown in FIG. 4, data from the computer system 112 may be transmitted to a computer 720 on a cloud side through a network for further processing. The network and an intermediate node may include various configurations and protocols, including the Internet, the World Wide Web, an intranet, a virtual private network, a wide area network, a local area network, a dedicated network using a proprietary communication protocol of one or more companies, Ethernet, Wi-Fi, HTTP, and various combinations thereof. Such communication may be performed by any device that can transmit data to and from other computers, such as a modem or a wireless interface.

In an example, the computer 720 may include a server having a plurality of computers, such as a load balancing server cluster, and exchanges information with different nodes of the network for the purpose of receiving, processing, and transmitting data from the computer system 112. The server may be configured by the computer system 110. The server has a processor 730, a memory 740, an instruction 750, and data 760.

The data 760 may include a plurality of groups of driving parameter values. The server 720 may receive, monitor, store, update, and transmit various information related to a road environment, calculate related risk level data, and send a corresponding driving parameter to the vehicle based on the risk level and the driving preference of the driver. The vehicle travels based on the new traveling parameter.

The road environment information collected by the sensor system 104 in the vehicle 100 is sent to the cloud server, to refresh a degree of risk of the road environment.

The autonomous driving control method provided in this embodiment of this application may be applied to assisted driving and autonomous driving, to meet a personalized requirement of a driver and adapt to an external environment. A low-complexity processing manner without calculation not only saves computing resources, but also ensures driving safety.

Figure 5:
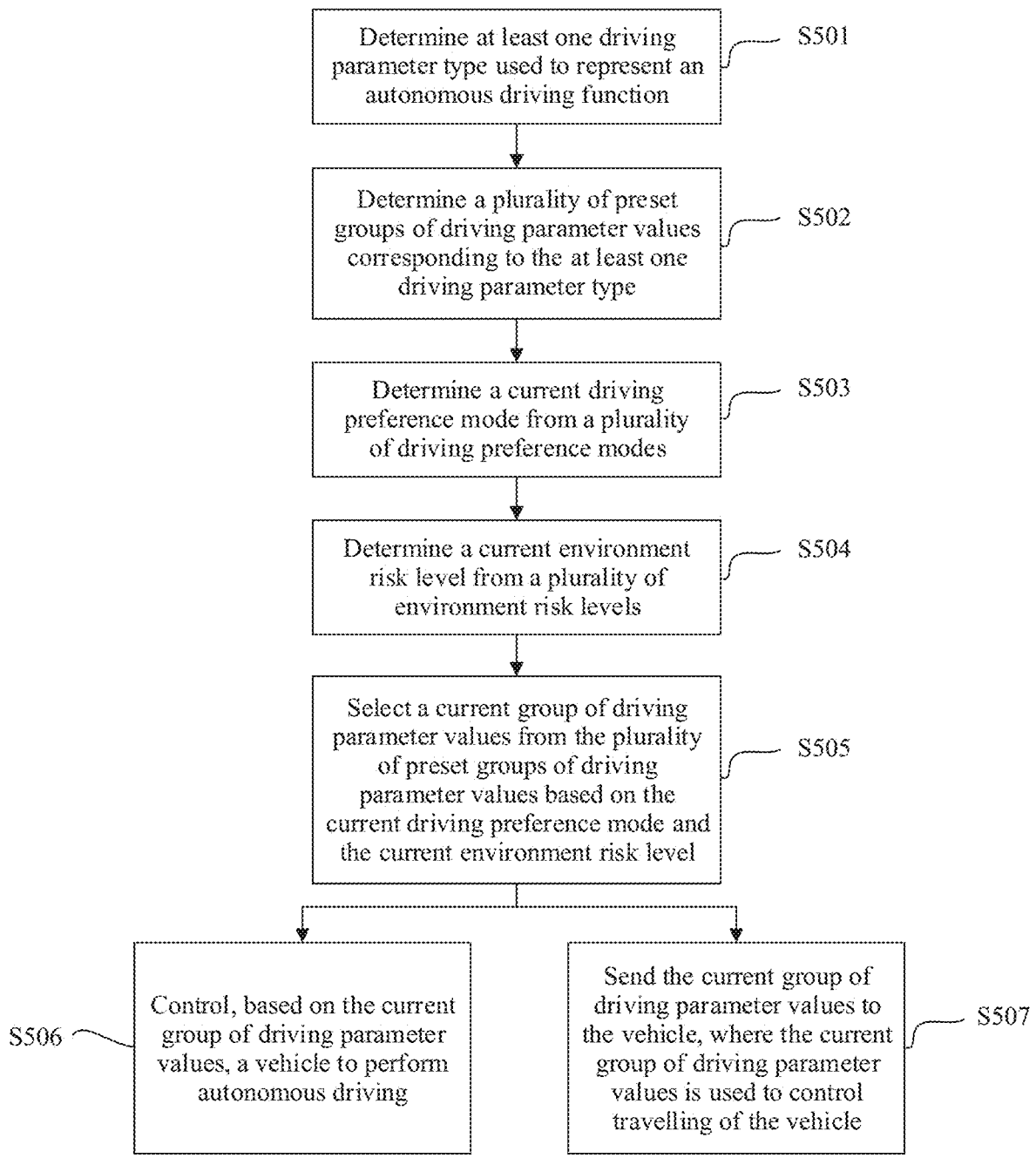
FIG. 5 is a schematic flowchart of an autonomous driving control method according to an embodiment of this application.

FIG. 5 is a schematic flowchart of an autonomous driving control method according to an embodiment of this application. The method may be applied to the autonomous driving control system in FIG. 3 or FIG. 4. The method includes the following several steps.

S501: Determine at least one driving parameter type used to represent an autonomous driving function.

A driver first performs a specific autonomous driving function, and the autonomous driving control system determines a type of the autonomous driving function based on a received instruction.

Specifically, before starting a vehicle or in a driving process, the driver may choose to enable the autonomous driving function. The autonomous driving function includes adaptive cruise control ACC, automatic emergency braking AEB, forward collision warning FCW, and lane department warning LDW.

The driver may simultaneously enable the foregoing plurality of autonomous driving functions by using an input device, or may choose to enable one or more of the foregoing autonomous driving functions.

The input device may be a button, a key, or a touchscreen. The driver may select by tapping the touchscreen.

Because the control system adjusts different types of parameters for different autonomous driving functions, for an autonomous driving function, the control system may adjust parameter values of one or more types of parameters to adjust the autonomous driving function. Therefore, the control system determines, based on a specific autonomous driving function, a type to represent a driving parameter of the autonomous driving function.

Specifically,

Table 1 describes a correspondence between the autonomous driving function and the driving parameter type. Because specific descriptions are provided above, refer to the foregoing descriptions. Details are not described herein.

In addition, selection of the parameter types above is merely an example. Other appropriate parameters may also be used based on a specific test result, or a new parameter may be redefined. For a specific autonomous driving function type, the foregoing uses only one parameter as an example for description.

S502: Determine a plurality of preset groups of driving parameter values corresponding to the at least one driving parameter type.

The control system determines, based on a type of a characterization parameter, the plurality of preset groups of driving parameter values corresponding to the characterization parameter. A specific determining process is shown in Table 2 or Table 3 and corresponding text parts. Details are not described herein.

S503: Determine a current driving preference mode from a plurality of driving preference modes.

The driving preference mode comprehensively reflects the driver's time and speed preference, driving capability, physical condition, and purpose of a current trip. For example, some drivers prefer driving at a high speed, and have strong driving ability, stable mental quality, and quick response, so these drivers prefer choosing to drive at a high speed to arrive in a shorter time. When a driver is in poor health, the driver tends to choose to drive at a low speed. Some drivers tend to drive at a high speed if these drivers are commuting, and do not tend to drive at a high speed if these drivers are going to an outing.

A quantity of preference modes can be set to two, three, or more based on an actual situation.

For an adaptive cruise control ACC system, a time headway THW is set to different values as different preference modes. For example, three headways, such as long, medium, and short, may be set as three preference modes.

For automatic emergency braking AEB, a time-to-collision TTC may be set to different values as different preference modes. For example, for normal duration and short duration, specifically, a time-to-collision suitable for most drivers, for example, 1 s, may be set as a preference mode, and then a time-to-collision suitable for drivers with high driving levels, for example, 0.9 s, may be set as another preference mode.

For lane department warning LDW, a time-to-lane-crossing (Time-to-lane-crossing, TTLC) may be set to different values as different preference modes. For example, for normal duration and short duration, specifically, a time-to-lane-crossing suitable for most drivers, for example, 0.7 s, may be set as a preference mode, and then a time-to-lane-crossing suitable for drivers with high driving levels, for example, 0.6 s, may be set as another preference mode.

For different autonomous driving function types, a preference mode may be independently selected for each function, or a preference mode may be selected in a unified manner. Further, the unified preference mode may also be integrated into an existing driving mode, for example, a comfortable driving mode, a normal driving mode, or a sports driving mode. For example, long duration corresponds to the comfortable driving mode, normal duration corresponds to the normal driving mode, and short duration corresponds to the sports driving mode.

The current preference mode may be determined from the plurality of preference modes, and may be selected by the driver, or may be directly determined by the system without being selected by the driver.

After selecting the autonomous driving function type as described above, the driver may continue to select the preference mode. For example, the driver may select in a form of a button, a key, sound control, or a touchscreen.

When the driver does not select a preference mode after selecting the foregoing autonomous driving function type as described above, the system automatically determines a preference mode for the vehicle. The autonomous driving control system may select a preference mode that is more conducive to safe driving as a default option, or may use a preference mode selected by a same driver last time as a default option, or may monitor a physical condition of the driver by using a fatigue monitoring system for determining. In addition, an identity recognition system is disposed to determine an identity of a driver, such as a fingerprint recognition system, a facial recognition system, an iris recognition system, or a voiceprint recognition system.

S504: Determine a current environment risk level from a plurality of environment risk levels.

The environment risk level is used to describe a risk degree of a current road environment, and may be used to indicate the vehicle to use a conservative and safe driving behavior method or a sports and radical driving behavior method. A source of risk level definition may be a current road environment feature, such as a curve or a construction area, or a current weather environment, such as rainy or snowy weather, or a driving safety risk (for example, a large quantity of take-over accidents or safety accidents are accumulated) in a current road environment. These sources are used to determine the risk level of the current road environment.

Optionally, the risk level may be detected by using a sensor of the vehicle to obtain an environment condition. The control system receives environment information collected by the sensor, and identifies the environment information, to determine the road environment risk level. The sensor may be, for example, a camera or a millimeter-wave radar.

Alternatively, the control system receives a notification message sent by a communication device. The notification message may be sent by using a high-precision map, or may be transmitted by using a technology such as V2X. Specifically, the notification message may be from a server, another vehicle, a roadside computer system, or the like.

The notification message includes indication information of the current environment risk level. The control system determines the current environment risk level based on the indication information, to detect a capability of the vehicle beyond a line of sight.

A quantity of the risk levels may be set to three levels: a high level, a medium level, and a low level. Alternatively, two or more levels may be set as required.

In a driving process of the vehicle, the autonomous driving control system determines, based on the environment condition, a risk level of the environment in which the vehicle is driven in real time.

Steps S501 and S502 may be performed before step S505, and are not limited to being performed before steps S503 and S504.

S505: Select a current group of driving parameter values from the plurality of preset groups of driving parameter values based on the current driving preference mode and the current environment risk level.

The autonomous driving control system selects, based on the determined preference mode and the real-time environment risk, a driving parameter corresponding to the environment risk level as a current driving parameter.

Specifically, for an autonomous driving function type, as shown in Table 2 or Table 3, a specific group of parameters may be selected as the current parameter value. Because specific descriptions are provided above, details are not described herein again.

The foregoing driving parameter may be a preset parameter table, and the preset parameter table is stored in a memory. After determining the environment risk level, the autonomous driving control system directly obtains, based on the preset parameter table, the driving parameter corresponding to the risk level without calculation.

The preset parameter value is set by a programmer in advance, and may be preset through a formula calculation and an actual drive test, or with reference to an existing driving parameter.

Mathematical modeling may be performed on the formula based on influencing factors such as a driver preference and an environment risk level, and values of different influencing factors are obtained to calculate the preset driving parameter.

The actual drive test is to obtain a value of the preset driving parameter by performing an actual test in different preference modes selected by a test vehicle platoon in various driving environments.

Alternatively, adjustment may be performed within a specific threshold range on a driving parameter value set by each existing large vehicle factory, and an adjusted value is used as a new preset parameter value.

S506: Control, based on the current group of driving parameter values, the vehicle to perform autonomous driving.

Further optionally, the foregoing autonomous driving control method is executed on a vehicle side, and after the selecting a current group of driving parameter values from a plurality of preset groups of driving parameter values based on the current driving preference mode and the current environment risk level, the method may further include: controlling, based on the current group of driving parameter values, the vehicle to perform autonomous driving.

The controlling herein represents direct control without using a network for transmission, and the driving control system is located at a vehicle end.

After determining the current driving parameter, the autonomous driving control system uses the new parameter value to perform the autonomous driving function.

S507: Send the current group of driving parameter values to the vehicle, where the current group of driving parameter values is used to control traveling of the vehicle Further optionally, the foregoing autonomous driving control method is executed on a network side, and after the selecting a current group of driving parameter values from a plurality of preset groups of driving parameter values based on the current driving preference mode and the current environment risk level, the method may further include:

sending the current group of driving parameter values to the vehicle, where the current group of driving parameter values is used to control traveling of the vehicle.

After receiving the current group of driving parameter values sent by the network side, the vehicle performs the autonomous driving function by using the new parameter value.

The autonomous driving control method provided in this embodiment may be applied to assisted driving and partially autonomous driving. Because a solution of a preset parameter is used in the control method, the autonomous driving control system does not need to perform calculation, but directly obtains a value based on a driver preference and a risk level. This reduces system complexity, and meets personalized requirements of a driver and objective requirements of an environment.

Figure 6:
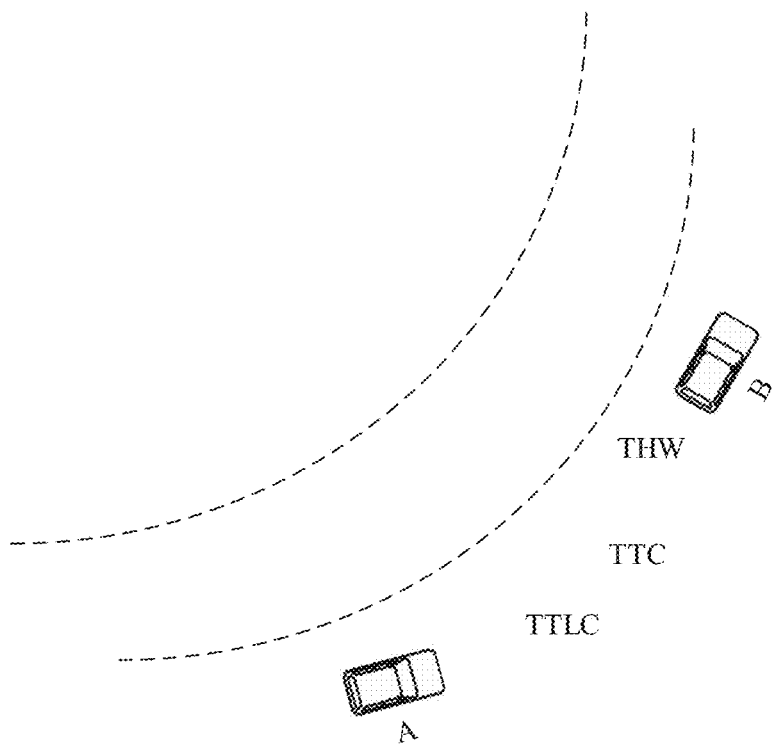
FIG. 6 is a schematic diagram of a scenario in which a vehicle passes through a curve according to an embodiment of this application.

FIG. 6 is a schematic diagram of a scenario in which a vehicle passes through a curve. The autonomous driving control system determines a road environment risk level based on a curve status of a road environment. For example, the autonomous driving control system may grade an environment risk level based on a curvature radius of the curve, and further determine driving parameters THW, TTC, and TTLC of the vehicle based on the environment risk level, to determine an autonomous driving behavior of the vehicle. Each autonomous driving function corresponds to one characterization parameter.

A schematic table is shown in Table 4.

|  | Environment risk level | | |
|---|---|---|---|
|  | Low | Medium | High |
|  | Road curvature radius (m) | | |
|  | r ≥ 1000 | 1000 > r ≥ 125 | r < 125 |
| ACC (THW) | 1.8/1.6/1.5 | 2.0/1.8/1.6 | 2.2/1.9/1.7 |
| AEB/FCW (TTC) | 0.8/0.9 | 0.9/1.0 | 1.0/1.1 |
| LDW (TTLC) | 0.5/0.6 | 0.6/0.7 | 0.7/0.8 |

The road environment risk level is determined based on the curve status of the road environment. For example, if the curvature radius is greater than 1000 m, the risk level is low. If the curvature radius is between 125 m and 1000 m, the risk level is medium. If the curvature radius is less than 125 m, the risk level is high.

For ACC: When the risk level is low, the ACC can keep a close distance. When the driving preference mode is safe, the THW may be set to 1.8 s. When the driving preference mode is normal, the THW may be set to 1.6 s. When the driving preference mode is fast, the THW may be set to 1.5 s.

If the risk level is high, a long distance needs to be maintained. When the driving preference mode is safe, the THW may be set to 2.2 s. When the driving preference mode is normal, the THW may be set to 1.9 s. When the driving preference mode is fast, the THW may be set to 1.7 s.

For AEB and FCW: When the risk level is low, the AEB/FCW may be triggered later, to prevent false triggering. When the driving preference mode is safe, the TTC may be set to 0.8 s. When the driving preference mode is normal, the TTC may be set to 0.9 s.

When the risk level is high, the AEB/FCW needs to reserve a long time. When the driving preference mode is safe, the TTC may be set to 1.0 s. When the driving preference mode is normal, the TTC may be set to 1.1 s.

For LDW: When the risk level is low, the LDW may have a greater degree of freedom of control. When the driving preference mode is safe, the TTLC may be smaller, for example, 0.5 s. When the driving preference mode is normal, the TTLC is 0.6 s.

When the risk level is high, the LDW may have a smaller degree of freedom. When the driving preference mode is safe, the TTLC needs to be set to a large value, for example, 0.7 s. When the driving preference mode is normal, the TTLC is 0.8 s.

Figure 7:
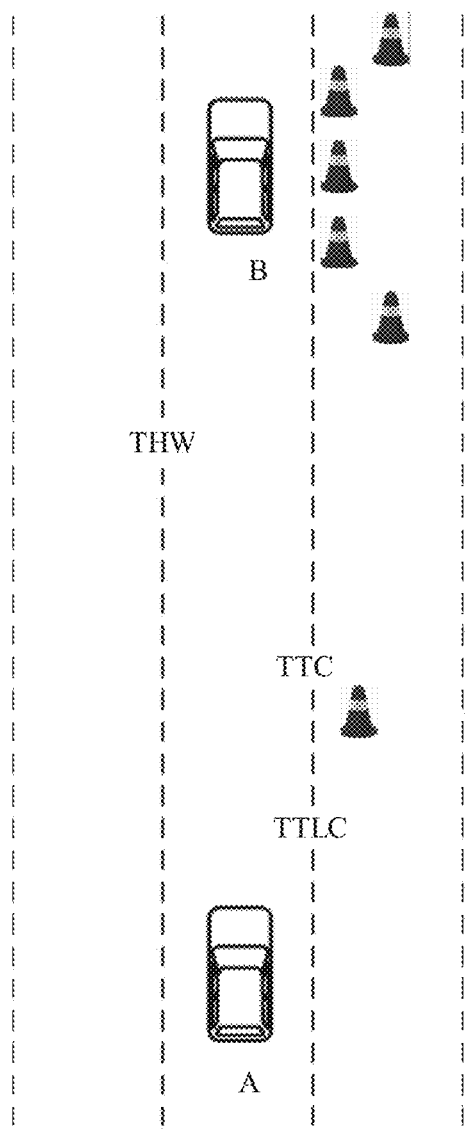
FIG. 7 is a schematic diagram of a scenario in which a vehicle encounters road construction according to an embodiment of this application.

FIG. 7 is a schematic diagram of a scenario in which a vehicle encounters road construction. The autonomous driving control system may determine a road environment risk level based on a construction area status of a road environment, for example, determine the environment risk level based on a quantity of construction roadblocks or a type of the construction area, and then determine driving parameters THW, TTC, and TTLC of the vehicle based on the environment risk level, to determine a driving behavior of the vehicle. Each autonomous driving function corresponds to one characterization parameter.

A schematic table is shown in Table 5.

|  | Road environment risk level | | |
|---|---|---|---|
|  | Low | Medium | High |
|  | Roadblocks in a construction area | | |
|  | No construction area | Construction roadblock ≤ 2 | Construction area |
| ACC (THW) | 1.8/1.6/1.5 | 2.0/1.8/1.6 | 2.2/1.9/1.7 |
| AEB/FCW (TTC) | 0.8/0.9 | 0.9/1.0 | 1.0/1.1 |
| LDW (TTLC) | 0.5/0.6 | 0.6/0.7 | 0.7/0.8 |

The road environment risk level is determined based on the construction area of the road environment. If there is no construction area, the risk level is low. If there are one or two roadblocks, the risk level is medium. If there is a construction area, the risk level is high.

For ACC: When the risk level is low, the ACC can keep a close distance. When the driving preference mode is safe, the THW may be set to 1.8 s. When the driving preference mode is normal, the THW may be set to 1.6 s. When the driving preference mode is fast, the THW may be set to 1.5 s.

If the risk level is high, a long distance needs to be maintained. When the driving preference mode is safe, the THW may be set to 2.2 s. When the driving preference mode is normal, the THW may be set to 1.9 s. When the driving preference mode is fast, the THW can be set to 1.7 s.

For AEB and FCW: When the risk level is low, the AEB/FCW may be triggered later, to prevent false triggering. When the driving preference mode is safe, the TTC may be set to 0.8 s. When the driving preference mode is normal, the TTC may be set to 0.9 s.

When the risk level is high, the AEB/FCW needs to reserve a long time. When the driving preference mode is safe, the TTC may be set to 1.0 s. When the driving preference mode is normal, the TTC may be set to 1.1 s.

For LDW: When the risk level is low, the LDW may have a greater degree of freedom of control. When the driving preference mode is safe, the TTLC may be smaller, for example, 0.5 s. When the driving preference mode is normal, the TTLC is 0.6 s.

When the risk level is high, the LDW may have a smaller degree of freedom. When the driving preference mode is safe, the TTLC needs to be set to a large value, for example, 0.7 s. When the driving preference mode is normal, the TTLC is 0.8 s.

Figure 8:
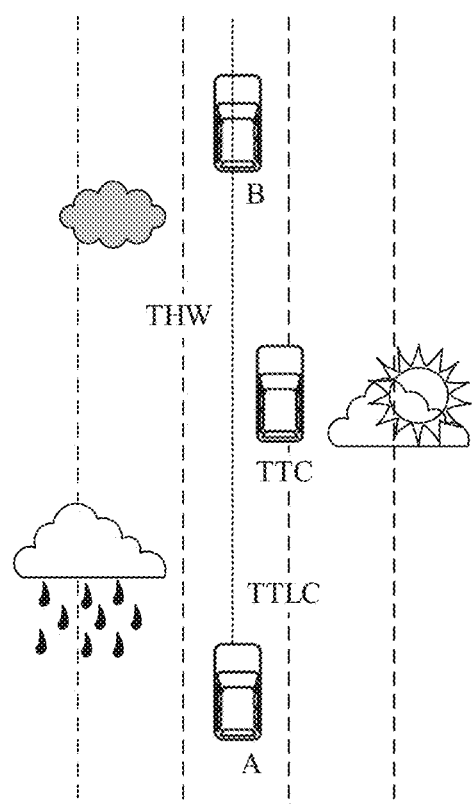
FIG. 8 is a schematic diagram of scenarios in which a vehicle travels in different weather conditions according to an embodiment of this application.

FIG. 8 is a schematic diagram of scenarios in which a vehicle travels in different weather conditions. A road environment risk level is determined based on the weather condition, for example, whether it is a cloudy day or a rainy day, and then travel parameters THW, TTC, and TTLC of the vehicle are determined based on the road environment risk level. Each autonomous driving function corresponds to one characterization parameter.

A schematic table is shown in Table 6.

|  | Road environment risk level | | |
|---|---|---|---|
|  | Low | Medium | High |
|  | Weather condition | | |
|  | Cloudy | Sunny | Rainy and snowy |
| ACC (THW) | 1.8/1.6/1.5 | 2.0/1.8/1.6 | 2.2/1.9/1.7 |
| AEB/FCW (TTC) | 0.8/0.9 | 0.9/1.0 | 1.0/1.1 |
| LDW (TTLC) | 0.5/0.6 | 0.6/0.7 | 0.7/0.8 |

A road environment risk level is determined based on a weather condition. For a camera that collects an image, an effect of the image collected on a cloudy day is good, and strong sunlight affects resolution of the image collected by the camera. Therefore, it may be considered that the risk level is low on cloudy days, the risk level is medium on sunny days, and the risk level is high on rainy and snowy days.

For ACC: When the risk level is low, the ACC can keep a close distance. When the driving preference mode is safe, the THW may be set to 1.8 s. When the driving preference mode is normal, the THW may be set to 1.6 s. When the driving preference mode is fast, the THW may be set to 1.5 s.

If the risk level is high, a long distance needs to be maintained. When the driving preference mode is safe, the THW may be set to 2.2 s. When the driving preference mode is normal, the THW may be set to 1.9 s. When the driving preference mode is fast, the THW can be set to 1.7 s.

For AEB and FCW: When the risk level is low, the AEB/FCW may be triggered later, to prevent false triggering. When the driving preference mode is safe, the TTC may be set to 0.8 s. When the driving preference mode is normal, the TTC may be set to 0.9 s.

When the risk level is high, the AEB/FCW needs to reserve a long time. When the driving preference mode is safe, the TTC may be set to 1.0 s. When the driving preference mode is normal, the TTC may be set to 1.1 s.

For ACC: When the risk level is low, the LDW may have a greater degree of freedom of control. When the driving preference mode is a safe mode, the TTLC may be smaller, for example, 0.5 s. When the driving preference mode is normal, the TTLC is 0.6 s.

When the risk level is high, the LDW may have a smaller degree of freedom. When the driving preference mode is safe, the TTLC needs to be set to a large value, for example, 0.7 s. When the driving preference mode is normal, the TTLC may be set to 0.8 s.

Similarly, the road environment risk level may be set based on more different weather features such as different illumination conditions and different wind force.

The foregoing factors that affect the environment risk level are merely examples for description, and other factors that affect the environment risk level may also be selected. Details are not described herein again.

An embodiment of this application further provides a driving parameter determining apparatus for autonomous driving. The apparatus may be shown in FIG. 3. The determining apparatus may include: a preference mode determining unit 202, configured to determine a current preference mode from a plurality of preference modes; a risk level determining unit 203, configured to determine an environment risk level; and a driving parameter selection unit 204, configured to select, in the current preference mode, a current driving parameter value corresponding to the environment risk level. A driving parameter value corresponding to the environment risk level is preset in each preference mode in the plurality of preference modes.

Further, the driving parameter value is preset by using at least one of the following methods: formula calculation, an actual drive test, or referring to an existing driving parameter.

In a possible implementation, the apparatus further includes a type selection unit 201, specifically configured to: determine an autonomous driving function type; and determine a driving parameter type based on the autonomous driving function type.

In another possible implementation, the risk level determining unit 203 is specifically configured to: receive environment information collected by a sensor; and determine the environment risk level based on the environment information collected by the sensor.

Optionally, the risk level determining unit 203 is specifically configured to receive the environment risk level, where the environment risk level is sent by using a cloud-end high-precision map or by using V2X.

Further, the determining an environment risk level includes: determining the environment risk level based on a curve, weather, road construction, or road accident situation.

In another possible implementation, an autonomous driving control unit 205 is specifically configured to control, based on the current driving parameter value, the vehicle to perform autonomous driving.

Further, the autonomous driving function includes any one of the following: adaptive cruise control (Adaptive Cruise Control, ACC), automatic emergency braking (automatic Emergency Braking, AEB), forward collision warning (Forward Collision Warning, FCW), lane department warning (Lane Department Warning, LDW), traffic-jam pilot (Traffic-jam Pilot, TJP), or highway pilot (Highway Pilot, HWP).

The foregoing driving parameter determining apparatus for autonomous driving in this embodiment may be configured to execute the technical solutions in the foregoing method embodiments. Implementation principles and technical effects thereof are similar. For functions of the modules, refer to corresponding descriptions in the method embodiments. Details are not described herein again.

An embodiment of this application further provides a chip, including a processor and an interface. The interface is configured to read processor-executable instructions from an external memory. The processor may be configured to execute the technical solutions in the foregoing method embodiments. Implementation principles and technical effects thereof are similar. For functions of the modules, refer to corresponding descriptions in the method embodiments. Details are not described herein again.

An embodiment of this application further provides a vehicle. The vehicle may be configured to perform the technical solutions in the foregoing method embodiments.

Implementation principles and technical effects thereof are similar. For functions of the modules, refer to corresponding descriptions in the method embodiments. Details are not described herein again.

An embodiment of this application further provides a server. The server may be configured to execute the technical solutions in the foregoing method embodiments. Implementation principles and technical effects thereof are similar. For functions of the modules, refer to corresponding descriptions in the method embodiments. Details are not described herein again.

Figure 9:
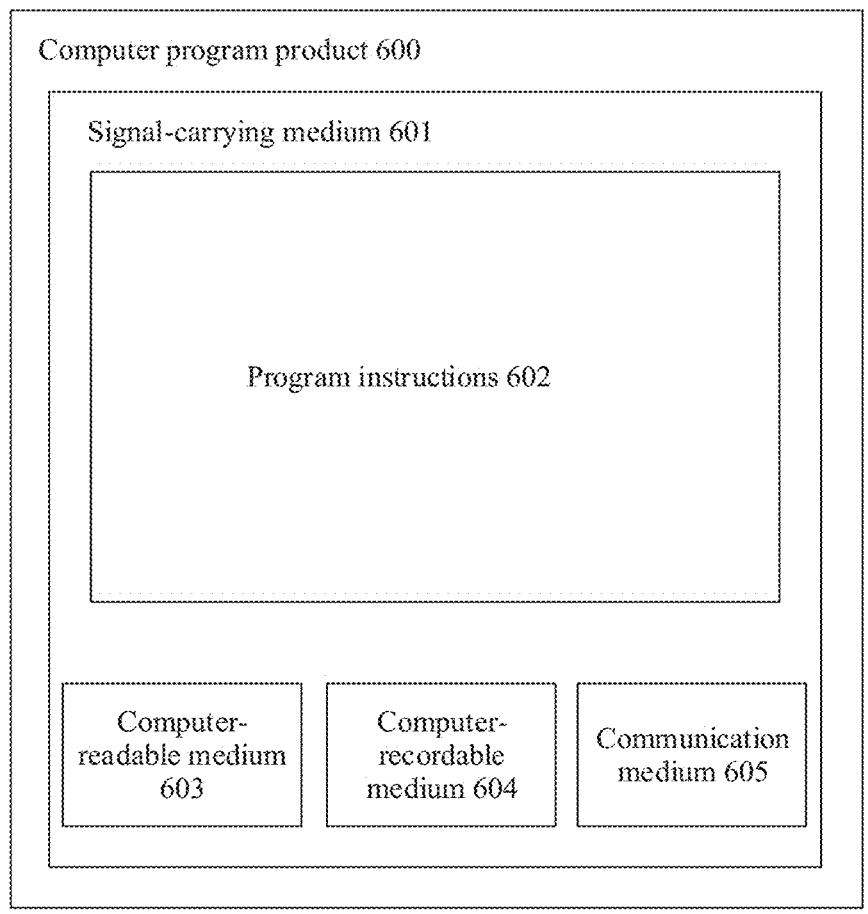
FIG. 9 is a schematic diagram of a structure of a computer program product according to an embodiment of this application.

In some embodiments, the disclosed methods may be implemented as computer program instructions encoded in a machine-readable format on a computer-readable storage medium or encoded on another non-transitory medium or product. FIG. 9 schematically shows a conceptual partial view of an example computer program product arranged according to at least some embodiments shown herein. The example computer program product includes a computer program for executing a computer process on a computing device. In an embodiment, an example computer program product 600 is provided by using a signal-carrying medium 601. The signal-carrying medium 601 may include one or more program instructions 602. When one or more processors run the program instructions, functions or some functions described in the foregoing FIG. 3 to FIG. 5 may be provided. Therefore, for example, refer to the embodiment shown in FIG. 5. One or more features of steps 501 to 506 may be undertaken by one or more instructions related to the signal-carrying medium 601. In addition, the program instruction 602 in FIG. 9 also describes example instructions.

In some examples, the signal-carrying medium 601 may include a computer-readable medium 603, for example, including but not limited to a hard disk drive, a compact disc (CD), a digital video disc (DVD), a digital magnetic tape, a memory, a read-only memory (Read-Only Memory, ROM), or a random access memory (Random Access Memory, RAM). In some implementations, the signal-carrying medium 601 may include a computer-recordable medium 604, for example, including but not limited to a memory, a read/write (R/W) CD, or an R/W DVD. In some implementations, the signal-carrying medium 601 may include a communication medium 605, for example, including but not limited to a digital and/or analog communication medium (for example, an optical cable, a waveguide, a wired communication link, or a wireless communication link). Therefore, for example, the signal-carrying medium 601 may be conveyed by the wireless communication medium 605 (for example, a wireless communication medium that complies with the IEEE 802.11 standard or another transmission protocol). The one or more program instructions 602 may be, for example, one or more computer-executable instructions or logic implementation instructions. In some examples, a computing device such as the computing device described in FIG. 3 to FIG. 5 may be configured to provide various operations, functions, or actions in response to the program instructions 602 that are transmitted to the computing device through one or more of the computer-readable medium 603, the computer-recordable medium 604, and/or the communication medium 605. It should be understood that the arrangement described herein is merely used as an example. Therefore, a person skilled in the art understands that other arrangements or other elements (for example, a machine, an interface, a function, a sequence, and a function group) can be used instead, and that some elements may be omitted based on an expected result. In addition, many of the described elements are functional entities that can be implemented as discrete or distributed components, or implemented in any suitable combination at any suitable position in combination with another component.

It should be noted that, in embodiments of this application, module division is an example, and is merely a logical function division. In actual implementation, another division manner may be used. Functional modules in embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in a form of a software functional module and sold or used as an independent product, the integrated module may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes several instructions for instructing a computer device (which may be a personal computer, a server, or a network device) or a processor (processor) to perform all or some of the steps of the methods described in embodiments of this application. The foregoing computer-readable storage medium includes any medium that can store a program, such as a USB flash drive, a removable hard disk, a ROM, a RAM, a magnetic disk, or an optical disc.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer program instructions are loaded and executed on a computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive Solid-state Drive (SSD)), or the like.

The program instruction may be implemented in a form of a software functional unit and can be sold or used as an independent product. The memory may be a computer-readable storage medium in any form. Based on such an understanding, all or some of the technical solutions in this application may be represented in a form of a software product. The software product includes several instructions for instructing a computer device, which may be specifically a processor, to perform all or some of the steps of the target detection apparatus in embodiments of this application. The foregoing storage medium includes: any medium that can store a program, such as a USB flash drive, a removable hard disk, a read-only memory (Read-Only Memory, ROM), a random access memory (Random Access Memory, RAM), a magnetic disk, or an optical disc.

The electronic device described in this embodiment may be configured to execute the technical solutions in the foregoing method embodiments. Implementation principles and technical effects thereof are similar. For functions of components, refer to corresponding descriptions in the embodiments. Details are not described herein again.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An autonomous driving control method, comprising:
storing mapping relationships among a plurality of preset groups of driving parameter values, a plurality of driving preference modes, and a plurality of environment risk levels, wherein each of the plurality of preset groups of driving parameter values comprises at least one driving parameter value, and each preset group of driving parameter values corresponds to a driving preference mode of the plurality of driving preference modes and an environment risk level of the plurality of environment risk levels;
determining a current driving preference mode from the plurality of driving preference modes, wherein the plurality of driving preference modes reflect different driving preferences;
determining a current environment risk level from the plurality of environment risk levels, wherein the plurality of environment risk levels reflect degrees of impact of different driving environments on autonomous driving safety; and
selecting, by querying the mapping relationships, a current group of driving parameter values from the plurality of preset groups of driving parameter values based on the current driving preference mode and the current environment risk level, wherein the current group of driving parameter values corresponds to the current driving preference mode and the current environment risk level.

2. The method according to claim 1, wherein before the selecting a current group of driving parameter values from a plurality of preset groups of driving parameter values based on the current driving preference mode and the current environment risk level, the method further comprises:
determining at least one driving parameter type representing an autonomous driving function; and
determining the plurality of preset groups of driving parameter values corresponding to the at least one driving parameter type.

3. The method according to claim 2, wherein the autonomous driving function comprises at least one of the following: adaptive cruise control (ACC), automatic emergency braking (AEB), forward collision warning (FCW), lane department warning (LDW), traffic-jam pilot (TJP), or highway pilot (HWP).

4. The method according to claim 1, wherein before the determining a current environment risk level from a plurality of environment risk levels, the method further comprises:
receiving environment information collected by a sensor; and
determining the current environment risk level from the plurality of environment risk levels based on the environment information.

5. The method according to claim 4, wherein the environment information comprises at least one of the following: a curve, weather, road construction, or road accident situation.

6. The method according to claim 1, wherein before the determining a current environment risk level from a plurality of environment risk levels, the method further comprises:
receiving a notification message sent by a communication device, wherein the notification message comprises indication information of the current environment risk level, and wherein the determining a current environment risk level from a plurality of environment risk levels comprises:
determining the current environment risk level from the plurality of environment risk levels based on the indication information.

7. The method according to claim 1, wherein after the selecting a current group of driving parameter values from a plurality of preset groups of driving parameter values based on the current driving preference mode and the current environment risk level, the method further comprises:
controlling traveling of a vehicle based on the current group of driving parameter values.

8. The method according to claim 1, wherein after the selecting a current group of driving parameter values from a plurality of preset groups of driving parameter values based on the current driving preference mode and the current environment risk level, the method further comprises:
sending the current group of driving parameter values to a vehicle, wherein the current group of driving parameter values is used to control traveling of the vehicle.

9. An apparatus, comprising:
one or more processors, and
a non-transitory storage medium in communication with the one or more processors, wherein the non-transitory storage medium stores program instructions that, when executed by the one or more processors, cause the apparatus to:
store mapping relationships among a plurality of preset groups of driving parameter values, a plurality of driving preference modes, and a plurality of environment risk levels, wherein each of the plurality of preset groups of driving parameter values comprises at least one driving parameter value, and each preset group of driving parameter values corresponds to a driving preference mode of the plurality of driving preference modes and an environment risk level of the plurality of environment risk levels;
determine a current driving preference mode from the plurality of driving preference modes, wherein the plurality of driving preference modes reflect different driving preferences;
determine a current environment risk level from the plurality of environment risk levels, wherein the plurality of environment risk levels reflect degrees of impact of different driving environments on autonomous driving safety; and
determine, by querying the mapping relationships, a current group of driving parameter values from the plurality of preset groups of driving parameter values based on the current driving preference mode and the current environment risk level, wherein the current group of driving parameter values corresponds to the current driving preference mode and the current environment risk level.

10. The apparatus according to claim 9, wherein the program instructions further cause the apparatus to:
   determine at least one driving parameter type representing an autonomous driving function; and
   determine the plurality of preset groups of driving parameter values corresponding to the at least one driving parameter type.

11. The apparatus according to claim 10, wherein the autonomous driving function comprises at least one of the following: adaptive cruise control (ACC), automatic emergency braking (AEB), forward collision warning (FCW), lane department warning (LDW), traffic-jam pilot (TJP), or highway pilot (HWP).

12. The apparatus according to claim 9, wherein the apparatus further comprises a receiver, and wherein the program instructions further cause the apparatus to:
   receive, through the receiver, environment information collected by a sensor; and
   determine, through the one or more processors, the current environment risk level from the plurality of environment risk levels based on the environment information.

13. The apparatus according to claim 12, wherein the environment information comprises at least one of the following: a curve, weather, road construction, or road accident situation.

14. The apparatus according to claim 9, wherein the apparatus further comprises a receiver, and wherein the program instructions further cause the apparatus to:
   receive, through the receiver, a notification message from a communication device, wherein the notification message comprises indication information of the current environment risk level; and
   determine, through the one or more processors, the current environment risk level from the plurality of environment risk levels based on the indication information.

15. The apparatus according to claim 9, wherein the program instructions further cause the apparatus to:
   control traveling of a vehicle based on the current group of driving parameter values.

16. The apparatus according to claim 9, wherein the program instructions further cause the apparatus to:
   send the current group of driving parameter values to a vehicle, wherein the current group of driving parameter values is used to control traveling of the vehicle.

17. A non-transitory computer-readable storage medium storing programming instructions for execution by at least one processor, that when executed by the at least one processor, cause a computer to perform operations comprising:
   storing mapping relationships among a plurality of preset groups of driving parameter values, a plurality of driving preference modes, and a plurality of environment risk levels, wherein each of the plurality of preset groups of driving parameter values comprises at least one driving parameter value, and each preset group of driving parameter values corresponds to a driving preference mode of the plurality of driving preference modes and an environment risk level of the plurality of environment risk levels;
   determining a current driving preference mode from the plurality of driving preference modes, wherein the plurality of driving preference modes reflect different driving preferences;
   determining a current environment risk level from the plurality of environment risk levels, wherein the plurality of environment risk levels reflect degrees of impact of different driving environments on autonomous driving safety; and
   selecting, by querying the mapping relationships, a current group of driving parameter values from the plurality of preset groups of driving parameter values based on the current driving preference mode and the current environment risk level, wherein the current group of driving parameter values corresponds to the current driving preference mode and the current environment risk level.

18. The non-transitory computer-readable storage medium according to claim 17, before the determining a current environment risk level from a plurality of environment risk levels, the operations comprising:
   receiving environment information collected by a sensor; and
   determining the current environment risk level from the plurality of environment risk levels based on the environment information.

19. The non-transitory computer-readable storage medium according to claim 17, before the determining a current environment risk level from a plurality of environment risk levels, the operations comprising:
   receiving a notification message sent by a communication device, wherein the notification message comprises indication information of the current environment risk level, and wherein the determining a current environment risk level from a plurality of environment risk levels comprises:
      determining the current environment risk level from the plurality of environment risk levels based on the indication information.

20. The non-transitory computer-readable storage medium according to claim 17, wherein after the selecting a current group of driving parameter values from a plurality of preset groups of driving parameter values based on the current driving preference mode and the current environment risk level, the operations comprising:
   sending the current group of driving parameter values to a vehicle, wherein the current group of driving parameter values is used to control traveling of the vehicle.

* * * * *